United States Patent [19]
Cooper

[11] Patent Number: 6,115,109
[45] Date of Patent: Sep. 5, 2000

[54] APPARATUS AND METHOD FOR SCANNING A LIGHT BEAM OVER AN IMAGE SURFACE

[75] Inventor: Alexander John Cooper, Swindon, United Kingdom

[73] Assignee: Fujifilm Electronics Imaging Ltd., London, United Kingdom

[21] Appl. No.: 09/090,799

[22] Filed: Jun. 4, 1998

[51] Int. Cl.[7] .............................. G03B 27/10; H04N 1/04
[52] U.S. Cl. .............................................. 355/84; 358/497
[58] Field of Search ..................... 355/79, 80, 84, 355/18, 48, 50, 72, 74, 75; 358/487, 496–498, 474

[56] References Cited

U.S. PATENT DOCUMENTS

| | | | |
|---|---|---|---|
| 5,429,202 | 7/1995 | Millard et al. | 180/79 |
| 5,451,777 | 9/1995 | Blake et al. | 250/234 |
| 5,801,851 | 9/1998 | Sheng | 358/497 |
| 5,917,618 | 6/1999 | Peng et al. | 358/498 |
| 5,973,796 | 10/1999 | Schissler et al. | 358/474 |

*Primary Examiner*—Safet Metjahic
*Assistant Examiner*—Hung Henry Nguyen
*Attorney, Agent, or Firm*—Sughrue, Mion, Zinn, Macpeak & Seas, PLLC

[57] ABSTRACT

Apparatus for scanning a light beam over an image surface includes a carriage assembly, including structure for directing a light beam over the image surface. A pad assembly, which is rotatably mounted to the carriage assembly, includes a pad surface. A slideway engages the pad surface to support the carriage. In use, a drive force is applied to the pad assembly so that the pad surface slides along the slideway in a given direction of movement as the light beam scans the image surface. A rotational force is applied to the pad assembly to cause the pad surface to pitch back on the slideway relative to the given direction of movement.

12 Claims, 5 Drawing Sheets

APPARATUS AND METHOD FOR SCANNING A LIGHT BEAM OVER AN IMAGE SURFACE

FIELD OF THE INVENTION

The present invention relates to a method and apparatus for scanning a light beam over an image surface such as a film or a transparency.

DESCRIPTION OF THE PRIOR ART

In a conventional imagesetter a film is exposed by a modulated light beam. The modulated light beam scans over the film to expose the film in a desired image pattern. It is important that the modulated light beam traverses at a constant speed to ensure that the film is exposed uniformly.

One type of known imagesetter comprises a cylindrical drum which carries the film to be exposed on an inner surface of the drum. A spinning mirror is mounted on a carriage which traverses along the length of the imagesetter drum. A laser beam is directed onto the spinning mirror and exposes the film as a series of circumferential scanlines. The carriage is mounted on a number of roller bearings which roll along a support extending along the length of the cylinder.

A problem with this arrangement is that imperfections in the roller bearings can cause a cyclical variation in the speed of traverse of the carriage. In order to solve this problem, the roller bearings have conventionally been replaced by pad assemblies, each having a pad surface which engages a slideway. As the carriage is driven along the length of the drum, the pad surfaces slide along the slideway. Examples of imagesetters with sliding pad assemblies are the Crosfield Celix 8000, Celix 4000 and Celix 2000 and the Fujifilm 8200.

A problem associated with conventional imagesetters is "white lining". The problem of "white lining" is illustrated in FIG. 1. The light beam exposes a series of dots on the film. As the carriage traverses along the length of the cylinder, the film is exposed in a series of parallel lines. In the ideal case, with the carriage traversing smoothly along the cylinder, the lines are equispaced as shown in FIG. 1a. However if the carriage does not traverse smoothly the film can be exposed as shown in FIG. 1b. In FIG. 1b, the carriage has stuck between exposing the first line of dots 1 and the second line of dots 2. This results in a visible white line 3 between the second row of dots 2 and the third row of dots 4. The underlying causes of "white lining" are not well understood.

FIGS. 2 and 3 are schematic views of the pad assembly of the Fujifilm 8200 imagesetter. FIG. 2 is a side view and FIG. 3 is an end view. The pad assembly comprises a cylinder 5 which supports a carriage (not shown) on a pair of roller bearings (only one roller bearing 6 being illustrated in FIG. 2). The roller bearings 6 permit relative rotational movement between the carriage and the cylinder 5, and transfer the weight of the carriage along a line of action $R_{yn}$ arranged in line with the centre of gravity A of the pad assembly. The cylinder 5 carries a pair of pads 7,8 which engage a complementary v-shaped slideway (not shown). The slideway provides a vertical reaction force $P_r$ which is offset from the centre of gravity A by a distance $z_n$. An oil film is provided in the slideway, and this produces a downwards vacuum force V. The carriage applies a horizontal drive force $C_n$ to the pad assembly via a drive arm 9 which is offset from the centre of gravity A by a distance d. The v-shaped slideway provides a frictional force $\mu(R_y+V)$ along a line of action approximately at the mid-point of the pads 7,8.

Summing moments about the centre of gravity A:

$\Sigma M_A = 0$ (with anti-clockwise moments defined as positive)

$$-C_n \cdot d + P_r \cdot z + R_{yn} \cdot 0 + \mu(R_{yn}+V) \cdot 0 = 0$$

$$z = \frac{C_H d}{P_r}$$

Therefore the clockwise moment $-C_H d$ generated by the drive force $C_n$ must be balanced by an equal and opposite anticlockwise moment. This anticlockwise moment is provided by the reaction force $P_r$ which is offset by a distance $z_r$ in the direction of movement by the pads 7,8 pitching forward on the v-shaped groove. Also if the pad assembly sticks a little, the force from the carriage increases causing an even greater clockwise moment which must be balanced by the pads pitching forward even further.

SUMMARY OF THE INVENTION

In accordance with a first aspect of the present invention there is provided apparatus for scanning a light beam over an image surface comprising a carriage assembly comprising a light beam directing assembly for directing a light beam onto said image surface;

a pad assembly rotatably mounted to said carriage assembly, said pad assembly comprising a pad surface;

a slideway which supports said carriage by engaging said pad surface;

a drive which applies a drive force in use to said pad assembly whereby said pad surface slides along said slideway in a direction of movement and said light beam scans over said image surface; and means for applying a rotational force to said pad assembly, wherein said rotational force causes said pad surface to pitch back on said sliding bearing relative to said direction of movement.

In accordance with a second aspect of the present invention there is provided a method of scanning a light beam over an image surface, the method comprising directing said light beam onto said image surface from a carriage assembly, said carriage assembly being mounted on a pad assembly, said pad assembly comprising a pad surface which is supported on a slideway; applying a drive force to said pad assembly whereby said pad surface slides along said slideway in a direction of movement and said light beam scans over said image surface; and applying a rotational force to said pad assembly whereby said pad surface pitches back on said slideway relative to said direction of movement.

The present invention recognizes that the problem of "white lining" is caused at least partially by the forward pitch of the pad surface on the sliding bearing. The invention provides a rotational force which causes the pad assembly to pitch back (instead of forward) on the slideway. It has been discovered that this results in improved hydrodynamic lubrication and consequently a reduction in "white lining".

In general the sum of the moments applied to the pad assembly (other than the moment applied by the reaction force of the slideway) are in a direction which tends to cause the pad surface to pitch back. As the pad surface pitches back, the line of action of the reaction force moves behind the centre of gravity of the pad assembly and provides an equal and opposite "pitch forward" moment.

The amount of backward pitch may be very small (for instance the leading edge of the pad surface may be lifted from the sliding bearing by only 1–2 micron with an angle of pitch less than 0.2 degrees) but it has been found that this is sufficient to provide improved flow of lubricant between the pad surface and the slideway.

In a less preferred example the drive force and the rotational force may be generated independently. For instance the means for applying a rotational force may comprise a spring which extends between the carriage assembly and the pad assembly and applies sufficient force to cause the pad surface to pitch back. Alternatively the carriage assembly and pad assembly may be arranged such that the weight of the carriage assembly is applied along a line of action positioned behind the centre of gravity of the pad assembly—resulting in a "pitch back" moment. However the problem with these solutions is that the independent rotational forces will only result in a "pitch back" moment when the carriage assembly is moving in one direction. If the carriage assembly is driven back in the opposite direction the pad surface will pitch down.

This problem may be solved by suitably adjusting the line of action of the independent rotational force (eg by moving the spring to an opposite side of the centre of gravity of the pad assembly when the direction of movement is reversed). However in a preferred embodiment said rotational force is provided by said drive (ie. the rotational force and the drive force are the same force) and said drive force is applied to said pad assembly along a line of action which is positioned such that said drive force has a moment which causes said pad assembly to pitch back on said slideway. This solution generates a "pitch back" moment regardless of the direction of movement of the carriage.

Typically said slideway applies a friction force to said pad surface along a first line of action, said drive force is applied to said pad assembly along a second line of action, and said second line of action is positioned below said first line of action. In a steady-state situation the drive force and the friction force will be oppositely directed and approximately equal in magnitude and as a result their net moment will be in a "pitch back" direction. Typically said second line of action also lies below the centre of gravity of said pad assembly.

The drive force may be applied directly to said pad assembly along the required line of action (ie. not via the carriage). However in a preferred embodiment the drive force is applied to the pad assembly via the carriage. In this case the line of action of the drive force is positioned by suitably arranging a drive coupling (such as a drive pin) which couples said carriage to said pad assembly, wherein said drive applies said drive force to said carriage and said drive coupling transmits said drive force to said pad assembly along said line of action.

The pad surface may lie in a horizontal plane. However in this arrangement the line of action of the drive force must be positioned below the slideway, for instance by applying the drive force to the end of a downwardly extending arm. Therefore in a preferred arrangement said pad surface is inclined about said direction of movement whereby said pad surface defines a horizontal plane of average height, and said line of action of said drive force is positioned below said horizontal plane of average height. This enables the drive force to be applied above the slideway.

In a preferred arrangement said slideway comprises a groove which may be v-shaped or semicircular in cross-section. The pad surface may comprise a single continuous surface which is seated in the groove, or may comprise a plurality of separate pad surfaces.

The carriage assembly may be mounted on a single pad assembly but typically a pair of pad assemblies are provided with one at each end of the carriage assembly.

The apparatus may be provided as part of an input scanner which scans an unmodulated light beam over an original image (eg. a transparency). The light beam is modulated by the original image and the modulated light beam is monitored to generate an electronic representation of the original image. Alteratively the apparatus may comprise an output scanner (known as an imagesetter) in which said image surface is provided by a film, and said light beam exposes said film.

The light beam directing assembly may comprise a light source (eg. a laser) or a mirror which reflects a laser beam from a remote light source onto the image surface.

BRIEF DESCRIPTION OF THE DRAWINGS

An embodiment of the present invention will now be described with reference to the accompanying Figures in which.

DETAILED DESCRIPTION OF A PREFERRED EMBODIMENT

Figure 4:
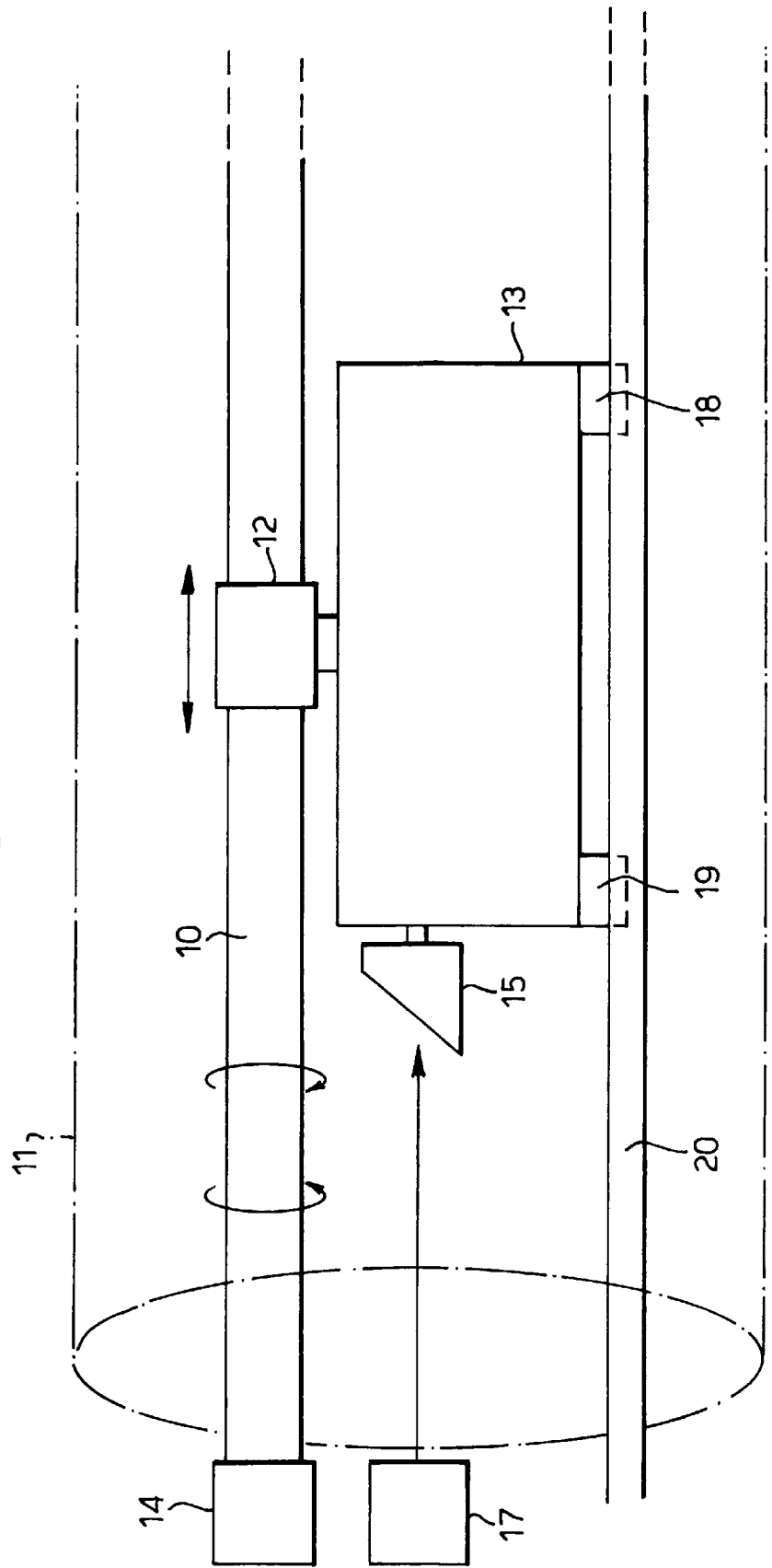
FIG. 4 is a schematic side view of an example of an imagesetter according to the present invention.

Referring to FIG. 4, an externally threaded leadscrew 10 extends along the length of the interior of a cylinder 11 (shown in dashed lines). An internally threaded gimbal 12 is mounted on the leadscrew 10 and a carriage 13 is suspended on the gimbal 12. In use, the leadscrew 10 is rotated anti-clockwise or clockwise by a drive 14. This causes the gimbal 12 to move along the leadscrew 10, carrying the carriage 13 with it. The carriage 13 carries a spinning mirror 15. A laser beam 16 is directed onto the spinning mirror 15 from a laser 17. As the carriage traverses along the length of the cylinder, the laser beam 16 is reflected onto the interior of the cylinder 11 as a series of circumferential scan lines. The carriage is mounted on a pair of pad assemblies 18,19 which are seated in a pad slideway 20.

Figure 5:
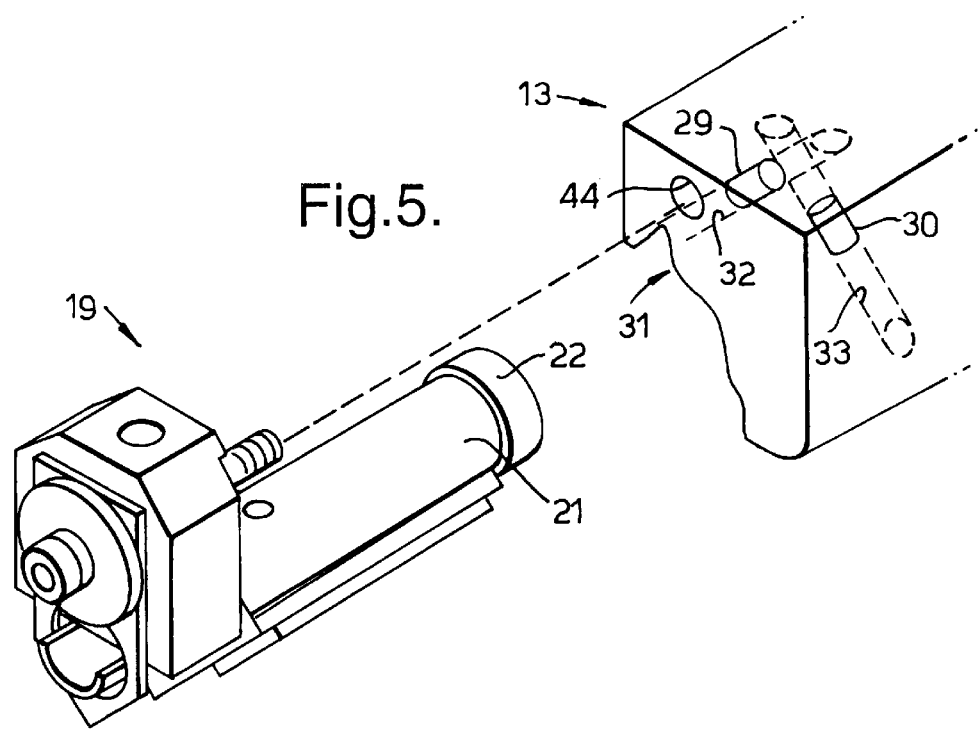
FIG. 5 is a perspective exploded view showing the pad assembly and one end of the carriage.
Figure 6:
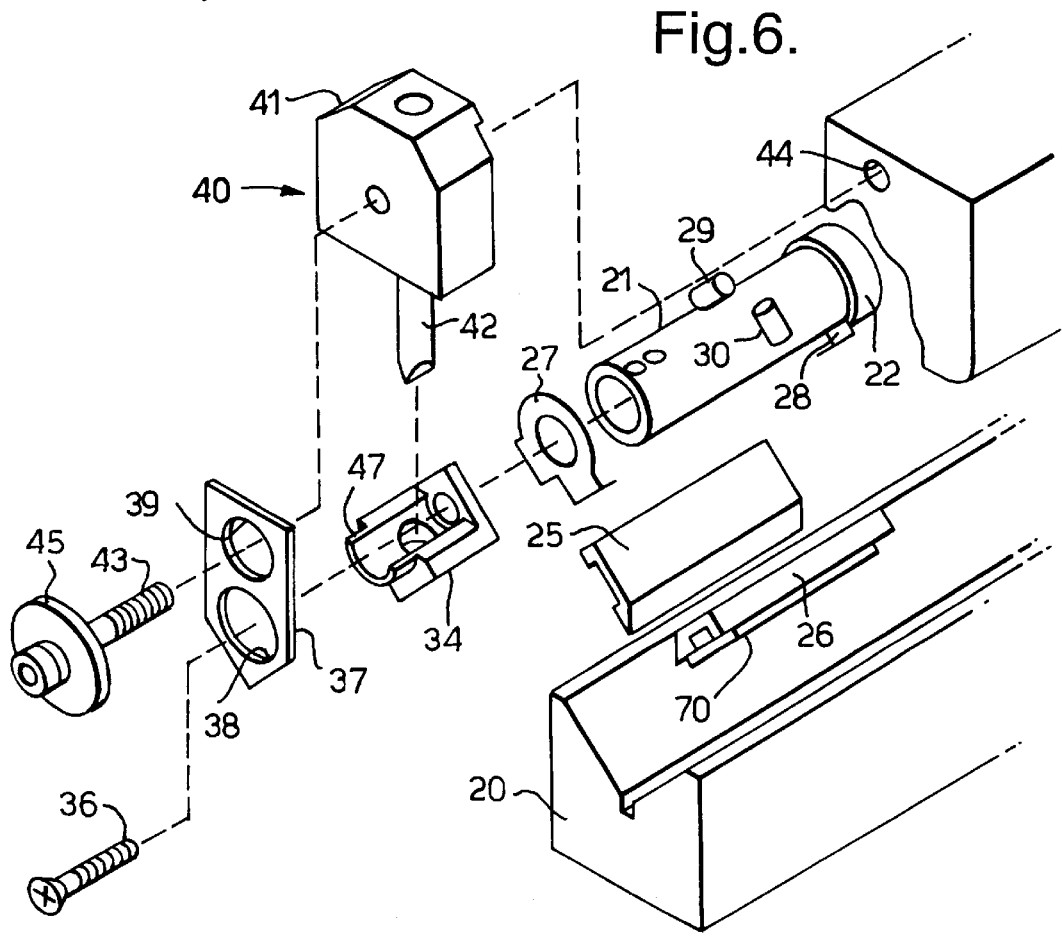
FIG. 6 is a perspective exploded view showing the pad assembly 19 (in exploded form), one end of the carriage and the pad slideway 20.
Figure 7:
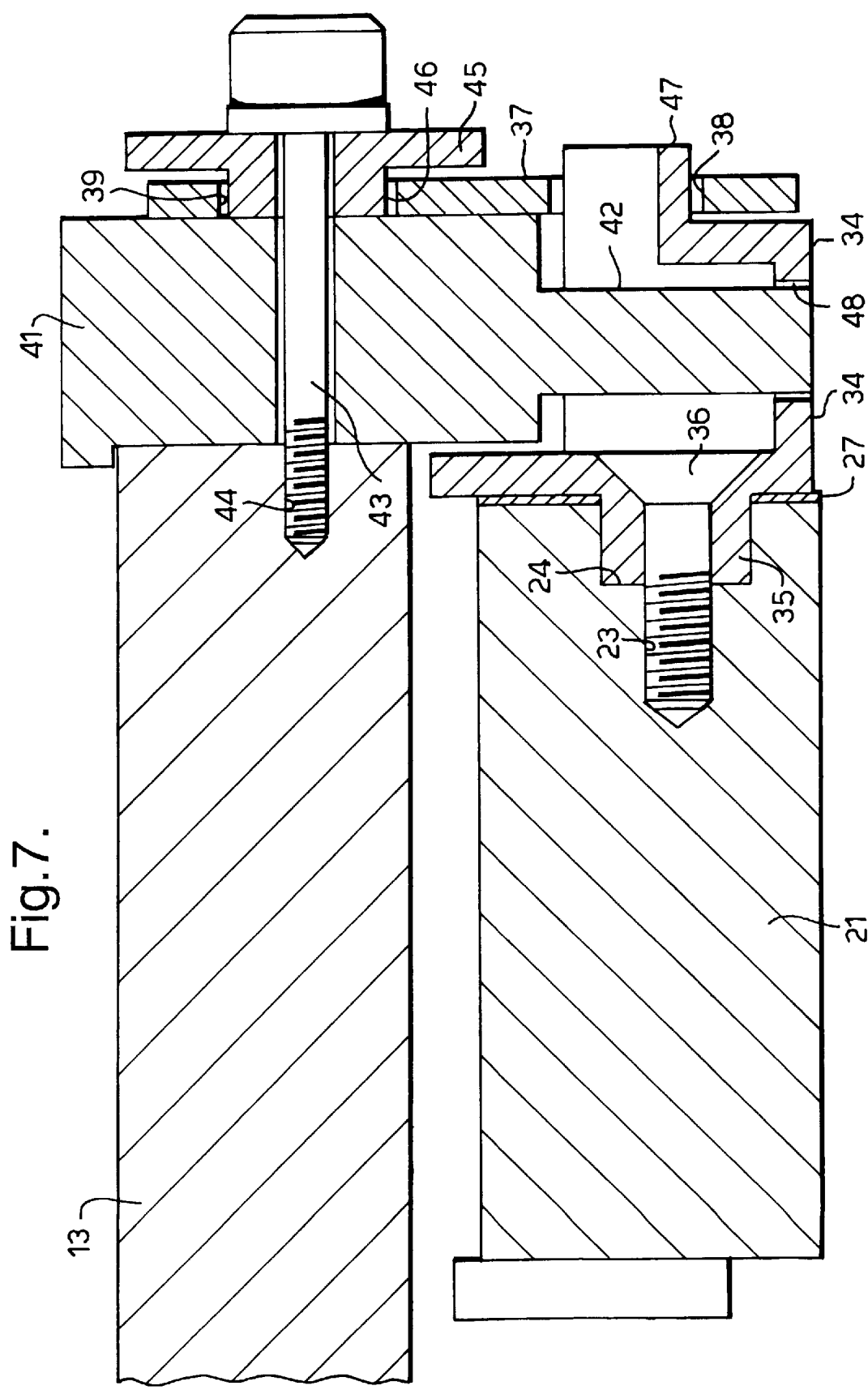
FIG. 7 is a cross section taken through the centre of the pad assembly and carriage.

Referring to FIGS. 5–7, the pad assembly 19 comprises a cylinder 21 with a flange 22 at one end and an internally threaded bore 23 and seat 24 at the other end. A pair of pads 25 and 26 are secured onto the cylinder 21 by a pair of retaining clips 27,28. The retaining clip 28 is retained by the flange 22. The pads 25,26 each have planar pad surfaces which engage the slideway 20. Only one of the pad surfaces 70 is shown in FIG. 6, the other being hidden.

The carriage 13 has a groove 31 which receives the cylinder 21 and a pair of angled bores 32,33 which open into the groove 31. A pair of roller bearings 29,30 are glued (or fitted as a transitional fit) into the bores 32,33 and their lower surfaces extend into the groove 31 to provide bearing surfaces which engage the cylinder 21 (as indicated in the view of FIG. 6).

A cylinder extension 34 has a boss 35 (shown in FIG. 7 and hidden in FIG. 6) which is received in the seat 24. The cylinder extension 34 and retaining clip 27 are secured to the cylinder 21 by a screw 36 which is screwed into a threaded bore 23.

A floating link plate 37 has a lower aperture 38 and an upper aperture 39. A drive pin assembly 40 comprising a drive pin mounting 41 and drive pin 42 is secured to the carriage 13 by a screw 43 which screws into a threaded bore 44, and a top-hat washer 45. The boss 46 of the washer 45 is received in the upper aperture 39, with a clearance to permit relative movement between the washer 45 and the floating link plate 37. The lower aperture 38 of the floating link plate receives a semi-cylindrical boss 47 at one end of the cylinder extension 34, with a clearance to permit relative movement between the cylinder extension 34 and the floating link plate 37.

Figure 8:
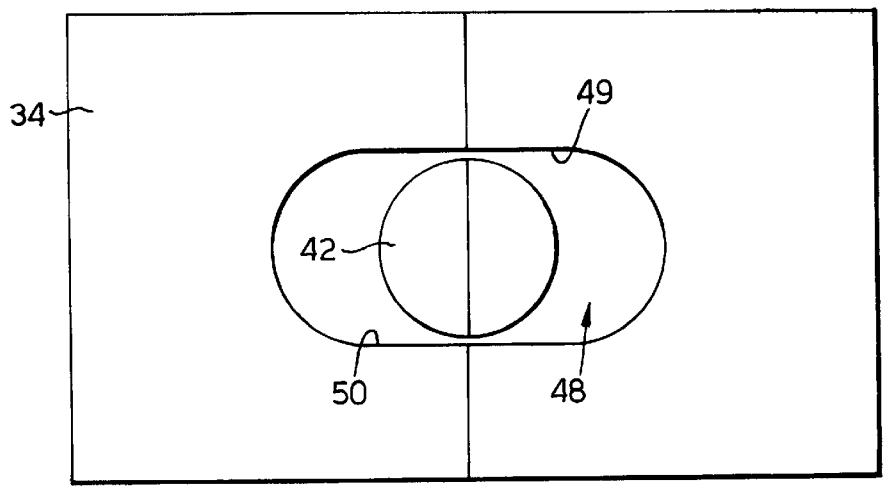
FIG. 8 is an underneath view of the cylinder extension and drive pin.

The drive pin 42 has a tapered tip which is received in a hole 48 at the base of the cylinder extension 34. There is a 0.1 mm clearance between the tip of the drive pin 42 and the front and rear edges 49,50 of the hole 48 (as shown in FIG. 8).

Figure 1A:
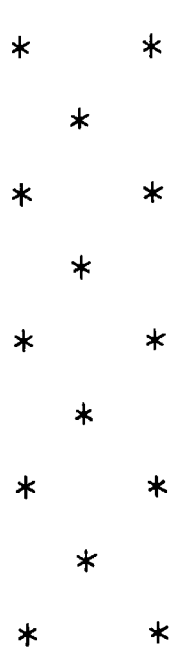
FIGS. 1a & b illustrate the problem of "white lining"
Figure 1B:
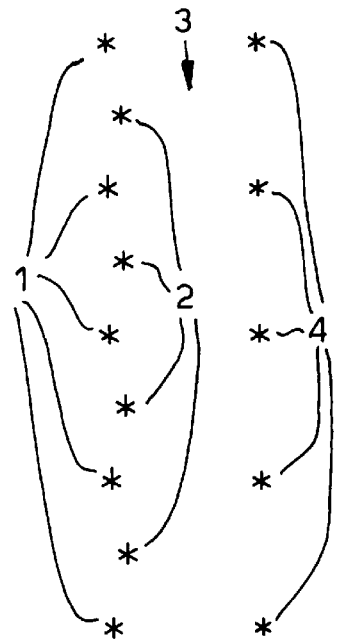
Figure 2:
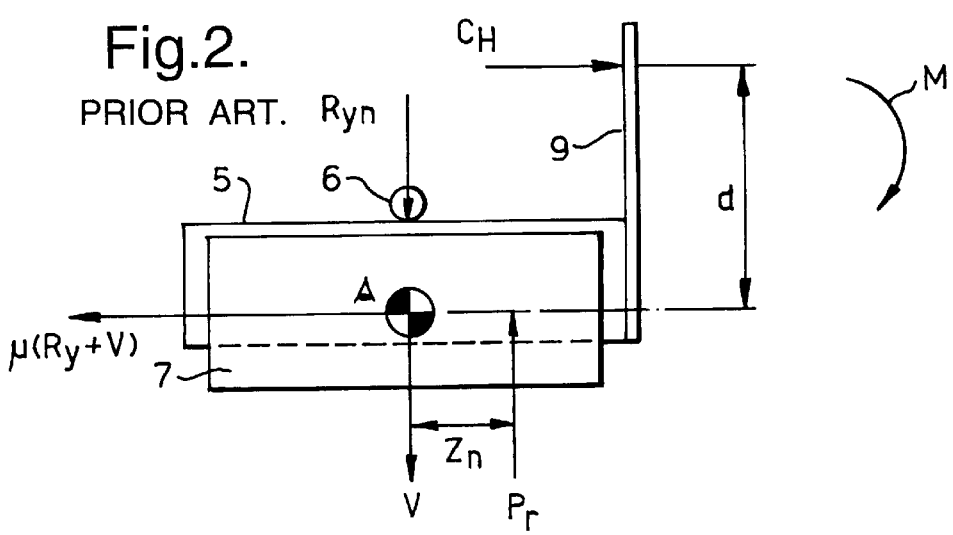
FIG. 2 is a schematic side view of a conventional pad assembly.
Figure 3:
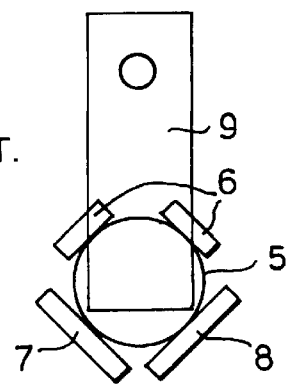
FIG. 3 is a schematic end view of the pad assembly shown in FIG. 2.
Figure 9:
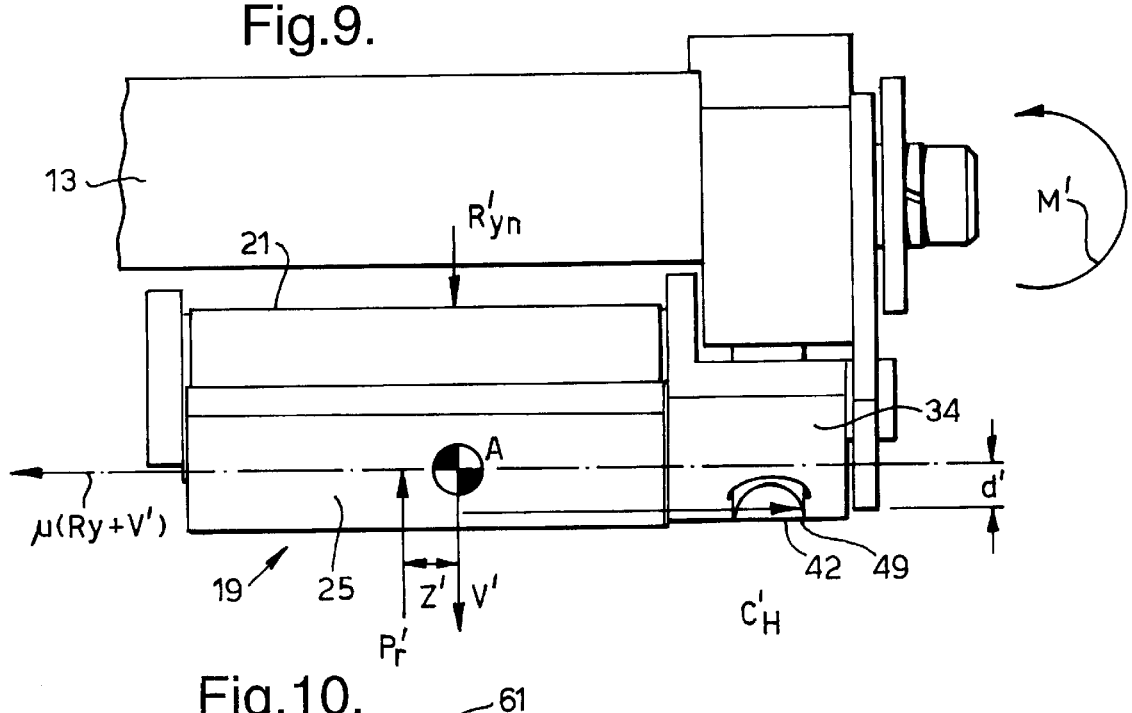
FIG. 9 is a side view showing the lines of action of the forces acting on the pad assembly.

FIG. 9 shows the lines of action of the forces acting on the pad assembly 19. The same notation as FIG. 2 is used. The clearances provided by the apertures 38,39 and 48 permit items 21,28,27,25,26 and 34 to rotate about the roller bearings 29,30 to a limited extent. The centre of gravity of these items is indicated at A. The roller bearings 29,30 transfer the weight of the carriage 13 onto the cylinder 21 as a pair of point loads $R'_{yn}$, and are arranged above the centre of gravity A, so that the combined line of action of the forces $R'_{yn}$ passes through the centre of gravity A. The slideway 20 provides a vertical reaction force $P'_r$ which is offset behind the centre of gravity A by a distance z'. An oil film is provided in the groove, and this produces a downwards vacuum force V'. The drive pin 42 applies a horizontal drive force $C'_H$ to the front edge 49 of the hole 48 in the cylinder extension 34, which is offset from the centre of gravity A by a distance d'. The slideway 20 provides a frictional force $\mu(R'_y+V')$. Since the pads 25,26 are inclined to the horizontal, the line of action of the frictional force lies along a horizontal plane of average height defined by the pad surfaces. In the case of FIG. 9 the pad surfaces are planar and therefore the horizontal plane lies at the mid-point of the pads 25,26.

Summing moments about the pad centre of gravity:

$\Sigma M_A = 0$ (with anti-clockwise moments defined as positive)

$+C'_n.d' - P'_r.z' + R'_{yn}.0 + \mu(R'_{yn}+V').0 = 0$ $$z' = \frac{C_H d}{P_r}$$

Therefore the anticlockwise moment $+C'_n d'$ generated by the drive force $C'_H$ must be balanced by an equal and opposite anticlockwise moment. This anticlockwise moment is provided by the reaction force $P'_r$ which is offset by a distance $z'_r$ opposite to the direction of movement by the pads 25,26 pitching back on the slideway. As shown in FIG. 9, the forces (other than the reaction force $P'_r$) acting on the pad assembly generate an anti-clockwise moment M'.

Figure 10:
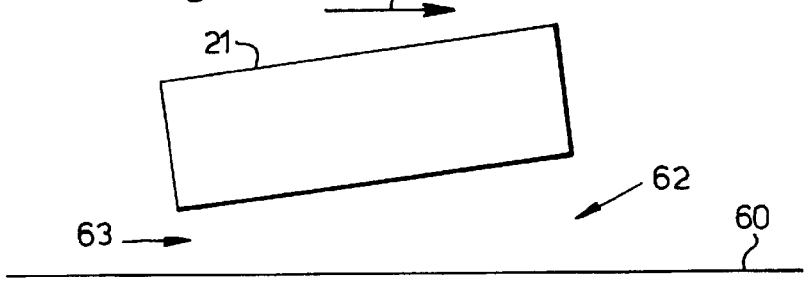
FIG. 10 is a schematic side view of the pitched back pad cylinder.

The backward pitch of the cylinder 21 is illustrated schematically in FIG. 10. The level of the slideway 20 is indicated at 60 and the direction of movement is indicated at 61. The angle of pitch is exaggerated in FIG. 10, and typically will be less than 0.2 degrees. As a result of the pitch back, the oil film is thicker at the inlet section 62 than at the outlet section 63. This enables the thicker film at the inlet section 62 to transport more oil than the thinner film at the outlet section 63. Because the flow in an infinitely wide slider must be constant throughout the entire section, the oil pressure must rise at the inlet section 62 to impede the flow and decrease at the outlet section 63 to enhance the flow. The pressure generated in such a converging gap is known as "wedging film action" and provides efficient hydrodynamic lubrication.

When the direction of movement is reversed, the drive pin 42 engages the rear edge 50 of the hole 48 in the cylinder extension 34 and still generates a "pitch back" moment.

In an alternative construction (not shown) a pair of drive pins may be provided at each end of the pad assembly. In this case, only the drive pin at the "back" of the pad assembly relative to its direction of travel would be engaged to provide the motive force for the pad assembly.

I claim:

1. Apparatus for scanning a light beam over an image surface comprising
   a carriage assembly comprising a light beam directing assembly for directing a light beam onto said image surface;
   a pad assembly rotatably mounted to said carriage assembly, said pad assembly comprising a pad surface;
   a slideway which supports said carriage by engaging said pad surface;
   a drive which applies a drive force in use to said pad assembly whereby said pad surface slides along said slideway in a direction of movement and said light beam scans over said image surface; and
   means for applying a rotational force to said pad assembly, wherein said rotational force causes said pad surface to pitch back on said slideway relative to said direction of movement.

2. Apparatus according to claim 1 wherein said rotational force is provided by said drive, and wherein said drive force is applied to said pad assembly along a line of action which is positioned such that said drive force has a moment which causes said pad assembly to pitch back on said slideway.

3. Apparatus according to claim 2 wherein said slideway applies a friction force to said pad surface along a first line of action, said drive force is applied to said pad assembly along a second line of action, and said second line of action is positioned below said first line of action.

4. Apparatus according to claim 2 wherein said pad surface is inclined about said direction of movement whereby said pad surface defines a horizontal plane of average height, and said line of action is positioned below said horizontal plane of average height.

5. Apparatus according to claim 1 wherein said carriage assembly comprises a drive pin which engages said pad assembly and which is arranged to permit relative rotational movement between the drive pin and the pad assembly.

6. Apparatus according to claim 1 wherein said slideway comprises a groove.

7. Apparatus according to claim 6 wherein said groove is substantially v-shaped.

8. Apparatus according to claim 1 wherein said image surface is provided by a film, and said light beam exposes said film.

9. A method of scanning a light beam over an image surface, the method comprising directing said light beam onto said image surface from a carriage assembly, said carriage assembly being mounted on a pad assembly, said pad assembly comprising a pad surface which is supported on a slideway; applying a drive force to said pad assembly whereby said pad surface slides along said slideway in a direction of movement and said light beam scans over said image surface; and applying a rotational force to said pad assembly whereby said pad surface pitches back on said slideway relative to said direction of movement.

10. A method according to claim 9 wherein said rotational force is provided by said drive, and said method further comprises applying said drive force to said pad assembly along a line of action which is positioned such that said drive force has a moment which causes said pad assembly to pitch back on said slideway.

11. A method according to claim 9 wherein said slideway applies a friction force to said pad surface along a first line of action, said drive force is applied to said pad assembly along a second line of action, and said method further comprises positioning said second line of action below said first line of action.

12. A method according to claim 9 wherein said image surface is provided by a film and said light beam exposes said film.

* * * * *